(12) United States Patent
Li et al.

(10) Patent No.: US 8,143,794 B1
(45) Date of Patent: Mar. 27, 2012

(54) LOW VOLTAGE LIGHT SOURCE DRIVING CIRCUIT

(75) Inventors: Eric Li, Milpitas, CA (US);
Shang-Kuan Tang, Fremont, CA (US);
Yi Zhang, Mountain View, CA (US)

(73) Assignee: SCT Technology, Ltd., Grand Cayman (KY)

(*) Notice: Subject to any disclaimer, the term of this patent is extended or adjusted under 35 U.S.C. 154(b) by 465 days.

(21) Appl. No.: 12/403,320

(22) Filed: Mar. 12, 2009

(51) Int. Cl.
*H05B 41/36* (2006.01)

(52) U.S. Cl. .................. 315/209 R; 315/224; 315/226; 315/209 T

(58) Field of Classification Search .............. 315/209 R, 315/210, 224, 225, 226, 209 T, 291, 294, 315/297, 299, 301, 307, 308, 311, 312, 313, 315/320, 361

See application file for complete search history.

(56) References Cited

FOREIGN PATENT DOCUMENTS

| WO | WO 2005/069863 A2 | 8/2005 |
|----|---------------------|--------|
| WO | WO 2007/038634 A2 | 4/2007 |

*Primary Examiner* — Douglas W Owens
*Assistant Examiner* — Jianzi Chen
(74) *Attorney, Agent, or Firm* — Fenwick & West LLP

(57) ABSTRACT

A low voltage LED (Light Emitting Diode) driving circuit operates under low supply voltage to provide stable and reliable control of LEDs. The LED driving circuit includes a switching transistor to turn on or off an output current in the LED. The LED driving circuit also includes a control transistor for controlling the level of the output current. The two transistors are coupled via a node that is maintained at a low voltage to increase the voltage across the switching transistor. The increased voltage across the switching transistor allows faster switching and more stable control over different levels of output voltage. The LED driver also includes circuit components for matching the turn-on times and turn-off times for different levels of the output current.

20 Claims, 8 Drawing Sheets

US 8,143,794 B1

LOW VOLTAGE LIGHT SOURCE DRIVING CIRCUIT

BACKGROUND OF THE INVENTION

1. Field of the Invention

The present invention relates generally to a light-emitting diode (LED) circuit, more specifically to a circuit for driving LED with variable output current.

2. Description of the Related Art

Light-emitting diodes (LEDs) are used in various display devices including LED video billboards. Display devices such as LED video billboards may include a large number of LEDs to produce high resolution images or videos. Brightness of the LEDs in such display devices fluctuate in response to current in the LEDs. Especially in large LED display devices, minor changes in the current may result in flickering visible to human eyes. Therefore, the current in the LED must be regulated by a LED driver circuit to maintain the current constant in the LED.

The LEDs in the LED video billboards may operate under different current conditions. Due to such different current conditions, the turn-on time or the turn-off time of each LED in the LED video billboards may also differ. Such differences in the timing may result in blurred images that degrade the quality of the images or videos displayed on the LED video billboards. Therefore, in order to provide dynamic video images of high quality, a mechanism is needed to synchronize the switching operations of the LEDs across different LEDs in the LED video billboards.

LED driver circuits may be used to control one or more LEDs. The LED driver functions as a current source or a current sink that regulates a constant current to flow in the LEDs despite changes in voltage conditions or variations in other operating conditions. Typically, the LED driver circuits consist of digital components that communicate with other digital circuitry in a display device and analog components for controlling the current in the LEDs. The LED driver circuits may be designed to control more than one LED according to digital signals received from other digital circuitry in the display device.

Most LED driver circuits for driving LEDs are based on high voltage CMOS (Complementary Metal-Oxide-Semiconductor) or bipolar junction transistors (BJT). The LED driver circuits based on high voltage CMOS or BJT are less sensitive to variations in the current and voltage, and therefore, are relatively easier to design. Most of other components associated with the LEDs, however, operate in low voltage (e.g., 5V). Therefore, a separate power source may be provided to the LED driver or the low voltage must be pulled up to a higher voltage to operate the LED driver.

SUMMARY OF INVENTION

Embodiments relate to a driving circuit for controlling an output current in a light source. The driving circuit includes an output stage that turns on or off the output current. The output stage may include a first transistor, a second transistor and a voltage regulator. The first transistor receives a switching signal to turn on or off the output current, the first transistor has a first node connected to the light source, a second node connected to a first junction node and an input node for receiving the switching signal. The second transistor controls the level of the output current based on a control signal when the first transistor is turned on. The control signal represents a desired output current in the light source. The second transistor has its first node connected to the first junction node and its second node connected to a low reference voltage node. The voltage regulator is connected to the first junction node to regulate a voltage at the first junction node to a low voltage level. By lowering the voltage at the first junction node, the voltage across the first node and the second node of the first transistor is increased.

In one embodiment, the driving circuit includes a control signal generator and a current-to-voltage converter. The control signal generator generates a first current proportional to a second current in a resistor connected to the control signal generator. The desired output current may be set by changing the resistance of the resistor. The current-to-voltage converter is placed between the control signal generator and the second transistor to generate the control signal based on the first current.

In one embodiment, the driving circuit includes a third transistor connected between a high reference voltage node and the first transistor via a second junction node. The third transistor produces a control current to the second junction node based on a first voltage signal varying according to the desired output current. The first voltage signal may be set to decrease time for turning on the first transistor as the desired output current is increased and increase time for turning on the first transistor as the desired output current is decreased.

In one embodiment, the driving circuit includes a fourth transistor connected between the low reference voltage node and the first transistor via the second junction node. The fourth transistor controls a drain current from the second junction node to the low reference voltage node based on a second voltage signal varying according to the desired output current to decrease time for turning off the first transistor as the desired output current is increased and to increase time for turning off the first transistor as the desired output current is decreased.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the present invention can be readily understood by considering the following detailed description in conjunction with the accompanying drawings.

DETAILED DESCRIPTION OF EMBODIMENTS

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1:
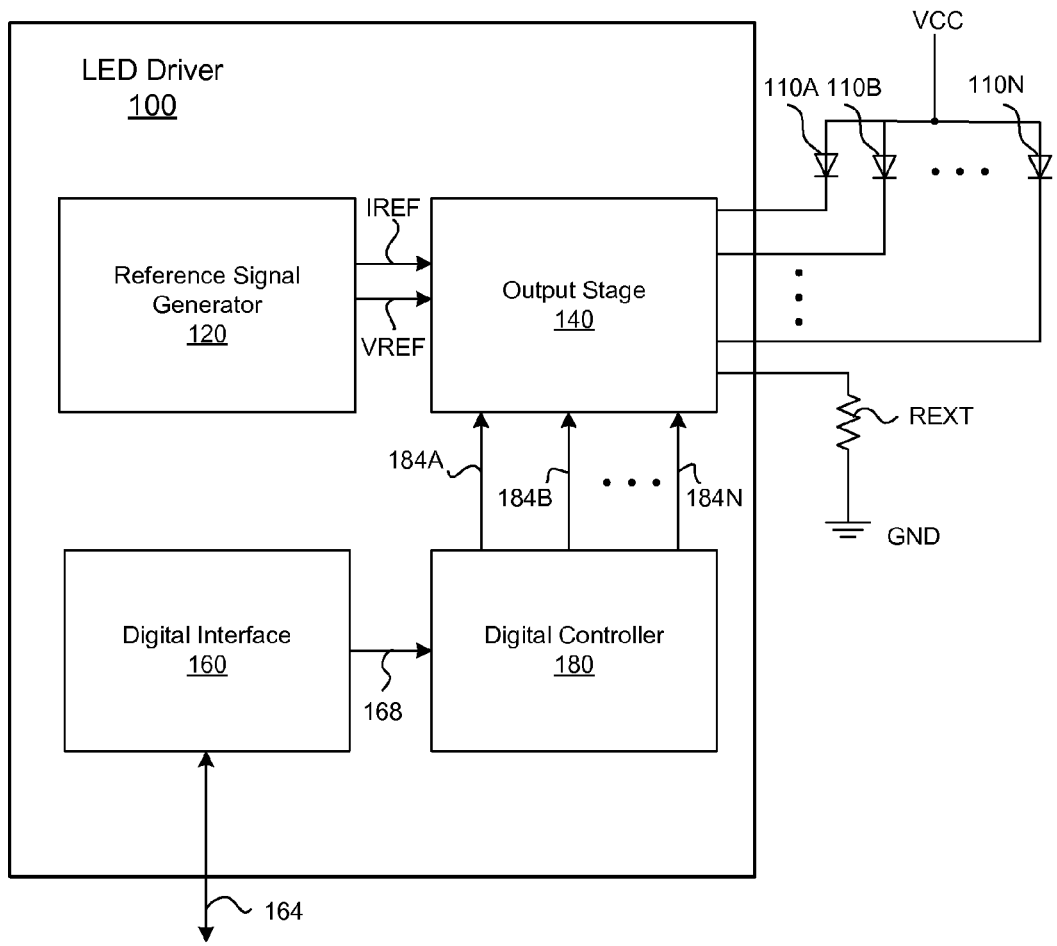
FIG. 1 is a block diagram illustrating an LED (light-emitting diode) driver, according to one embodiment.

FIG. 1 is a block diagram illustrating an LED (light-emitting diode) driver 100, according to one embodiment. The LED driver 100 functions as a current sink that controls output current from a plurality of LEDs 110A through 110N (hereinafter collectively referred to as "the LEDs 110") to ground (GND). The LEDs 110 are connected to a supply voltage source VCC and are turned on or off by the LED driver 100 according to switching signals 184A through 184N (hereinafter collectively referred to as "the switching signals 184"). The switching signals are generated by the digital controller 180. Although the LED driver 100 is described as being a current sink, modifications may be made to the LED driver 100 so that the LED driver 100 functions as a current source providing an output current to each of the LEDs 110. In one embodiment, the LED driver 100 controls sixteen (16) LEDs 110.

The LED driver 100 is also connected to an external resistor REXT that may be chosen to produce a desired output current at each of the LEDs 110. By changing the resistance of the resistor REXT, the output current Iout may be changed, as described below in detail with reference to FIGS. 3 and 4. In one embodiment, the higher resistance of the resistor REXT results in a lower output current Iout and the lower resistance of the resistor REXT results in a higher output current Iout.

The LED driver 100 may include, among other components, a reference signal generator 120, an output stage 140, a digital interface 160, and a digital controller 180. The reference signal generator 120 generates a current reference signal IREF and a voltage reference signal VREF, both of which remain constant regardless of the external resistor REXT. These two reference signals (IREF and VREF) are provided to, among other components, the output stage 140.

The digital interface 160 communicates with other digital components via a bus 164. The digital interface 160 receives digital signals indicating which of the LEDs 110 are to be switched on or off in a next cycle. The digital interface 160 then sends an operation signal 168 to the digital controller 180. Based on the operation signal 168, the digital controller 180 generates and sends the switching signals 184 to the output stage 140. The output stage 140 controls the output current Iout of each LED 110, as described below in detail with reference to FIG. 2.

In one embodiment, the components in the LED driver 100 are fabricated using ordinary 5V CMOS (Complementary Metal-Oxide-Semiconductor) fabrication process. Compared to using high voltage CMOS or BJT-based fabrication, using ordinary 5V CMOS technology to fabricate the LED driver 100 is advantageous because, among other reasons, the LED driver 100 may have a smaller die size and require fewer masking steps.

Figure 2:
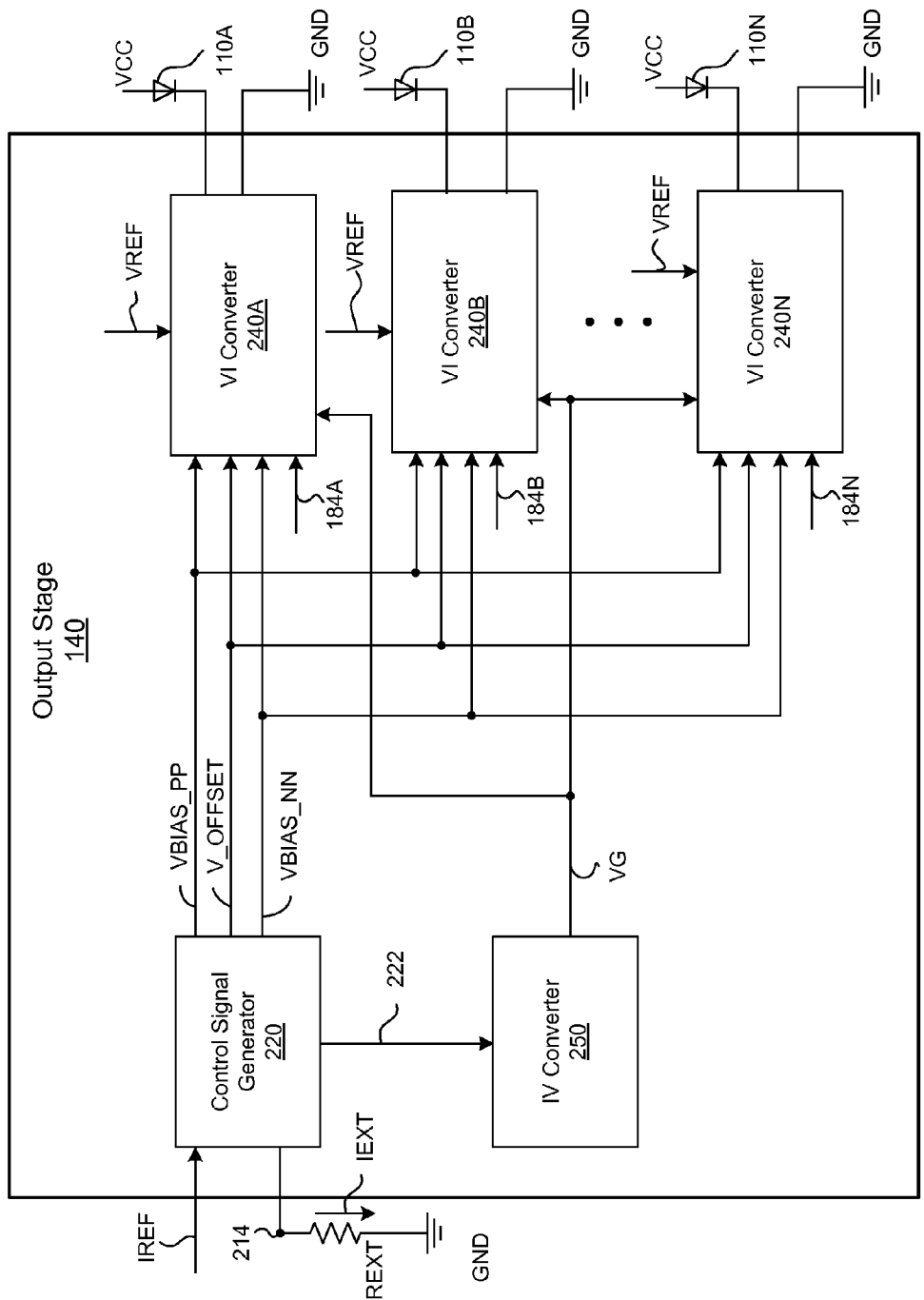
FIG. 2 is a block diagram illustrating an output stage of the LED driver of FIG. 1, according to one embodiment.

FIG. 2 is a block diagram illustrating the output stage 140 of the LED driver 100 of FIG. 1, according to one embodiment. The output stage 140 may include, among other components, a control signal generator 220, a current-to-voltage (IV) converter 250, and a plurality of voltage-to-current (VI) converters 240A through 240N (collectively referred to as "the VI converters 240"). The control signal generator 220 is connected to the external resistor REXT via a node 214 and generates variable control signals (VBIAS_PP, VBIAS_NN) and a first current 222. The control signal generator 220 also receives the reference current signal IREF from the reference signal generator 120 to generate fixed V_OFFSET voltage signal.

The control signals VBIAS_PP and VBIAS_NN vary according to the resistance of the external resistor REXT. The first current 222 is proportional to a current IEXT in the external resistor REXT. In one embodiment, the first current 222 is approximately IEXT/2. The VBIAS_PP and the VBIAS_NN are provided to the VI converters 240 to control the switching time of the LEDs 110, as described below in detail with reference to FIG. 4. The control signal generator 220 also produces a fixed voltage signal V_OFFSET that is offset from a supply voltage (VCC) by a certain offset voltage, as described below in detail with reference to FIG. 3.

The IV converter 250 receives the first current 222 from the control signal generator 220 and produces a voltage signal VG. The voltage signal VG rises or drops as the first current 222 is increased or decreased. The voltage signal VG is a control signal provided to the VI converters 240 to control the output current Iout according to the resistance of the external resistor REXT, as described below in detail with reference to FIG. 4. The IV converter 250 also functions as a driving component with high driving capability and wide bandwidth to maintain the voltage signal VG as set by the external resistor REXT despite disturbances from the IV converters 240.

The VI converters 240 receive fixed voltage signals (VREF and V_OFFSET) and variable voltage signals (VBIAS_PP, VBIAS_NN and VG). The VI converters 240 then turn on or off the LEDs 110 according to the switching signals 184 by turning on or off the output current Iout, as described below in detail with reference to FIG. 4. The level of the output current Iout when the LEDs 100 are turned on is controlled by the voltage signal VG.

Figure 3:
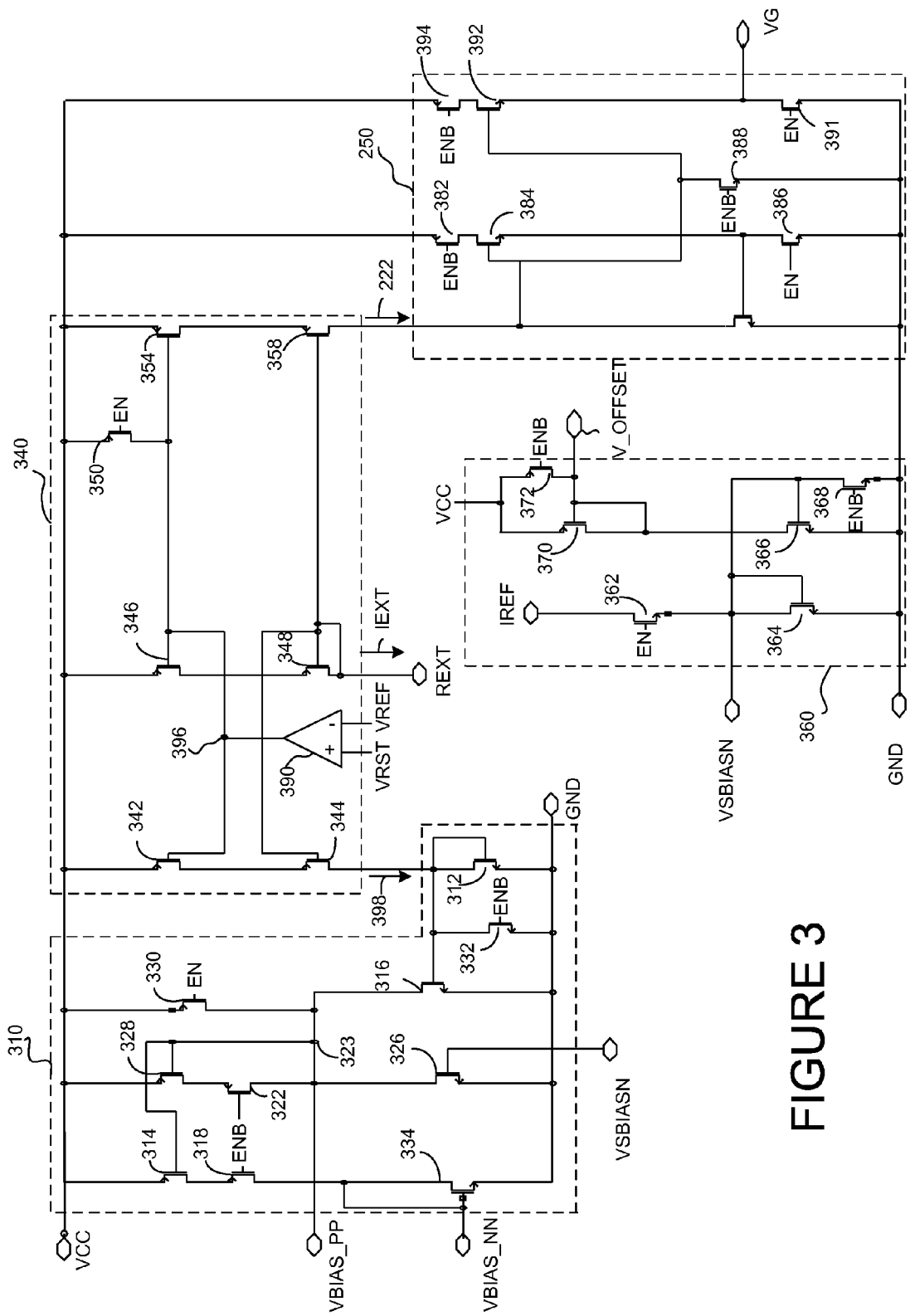
FIG. 3 is a block diagram illustrating a control signal generator and an IV (current-to-voltage) converter, according to one embodiment.

FIG. 3 is a block diagram illustrating a control signal generator 220 and an IV (current-to-voltage) converter 250, according to one embodiment. The control signal generator 220 may include, among other components, a bias voltage module 310, a feedback assisted current mirror 340, and a fixed bias voltage generator 360. The feedback assisted current mirror 340 may include, among other components, transistors 342, 344, 346, 348, 350, 354, 358, and an operational amplifier 390. The current mirror produces a second current 398 and the first current 222, both of which are proportional to the current IEXT in the external resistor REXT. The noninverting input node (+) of the operational amplifier 390 is connected to the node 214 to sense the voltage VRST across the external resistor REXT. The inverting input node (−) of the operational amplifier 390 is connected to receive the fixed voltage signal VREF from the reference signal generator 120. The operation of the current mirror 340 is well known in the art, and therefore, its explanation is omitted herein for the sake of brevity. The transistor 350 of the current mirror 340 receives an enable signal EN from to a pin of the LED driver 100. The current mirror 340 is disabled when the enable signal EN turns low and is enabled when the enable signal EN turns high.

The bias voltage module 310 is placed between a supply voltage line VCC and a ground line GND. The bias voltage module 310 receives the second current 398 proportional to the current IEXT. The bias voltage module 310 includes, among other components, transistors 312, 314, 316, 318, 326, 328, 330, 332 and 334. Based on the second current 398, the bias voltage module 310 outputs VBIAS_PP and VBIAS_NN voltage signals.

As the second current 398 increases (i.e., the IEXT increases), the voltage level of VBIAS_PP signal is decreased and the voltage level of VBIAS_NN signal is increased. Specifically, as the second current 398 is increased, N-MOS transistor 316 is operated so that the voltage level at a node 323 is lowered. Accordingly, the voltage level of VBIAS_PP signal is dropped. The lowered voltage level of node 323 also operates to apply a lower gate voltage to P-MOS transistor 314. The lowered gate voltage of the P-MOS transistor 314 then raises the voltage level at the gate of the transistor 334, and therefore, raises the voltage level of VBIAS_NN signal. As described below in detail with reference to FIG. 4, VBIAS_PP signal matches the turn-on time across different levels of the output current Iout. Similarly, VBIAS_NN signal matches the turn-off time across different levels of the output current Iout.

The fixed bias voltage generator 360 is placed between the supply voltage line VCC and the ground line GND. The fixed bias voltage generator 360 receives the reference current IREF to generate two fixed voltage output signals V_OFFSET and VSBIASN. V_OFFSET signal is provided to the VI converters 240 to provide fixed voltage nodes in the VI converters 240, as described below in detail with reference to FIG. 4. The VBIASN signal is provided to the bias voltage module 310. Specifically, VBIASN signal is applied to a gate of the transistor 326 to generate a current in the transistor 326 that is proportional to the reference current IREF. In one embodiment, the fixed bias voltage generator 360 includes transistors 362, 364, 366, 368, 370 and 372. The transistors 366, 370 and 372 produces V_OFFSET signal that is offset from the supply voltage VCC by a predetermined voltage. The transistor 362 is connected to receive the enable EN signal and the transistors 368, 372 are connected to receive an inverted EN signal (ENB). The fixed bias voltage generator 360 is enabled when EN signal is high (ENB signal is low) but disabled when ENB signal is high (EN signal is low).

The IV converter 250 receives the first current 222 and generates the voltage signal VG. The voltage signal VG rises or drops as the first current 222 is increased or decreased. The IV converter 250 has a high input impedance, high driving capacity and wide bandwidth to control the multiple VI converters 240 using the voltage signal VG. In one embodiment, the IV converter 250 includes transistors 382, 384, 386, 388, 390, 391 and 392. The operation of the IV converter 250 is well known in the art, and therefore, its explanation is omitted herein for the sake of brevity. The transistors 386 and 391 receive the EN signal and transistors 382, 388, 394 receive the inverted EN signal (ENB). The IV converter 250 is enabled when EN signal is high (ENB signal is low) and disabled when ENB signal is high (EN signal is low).

Figure 4:
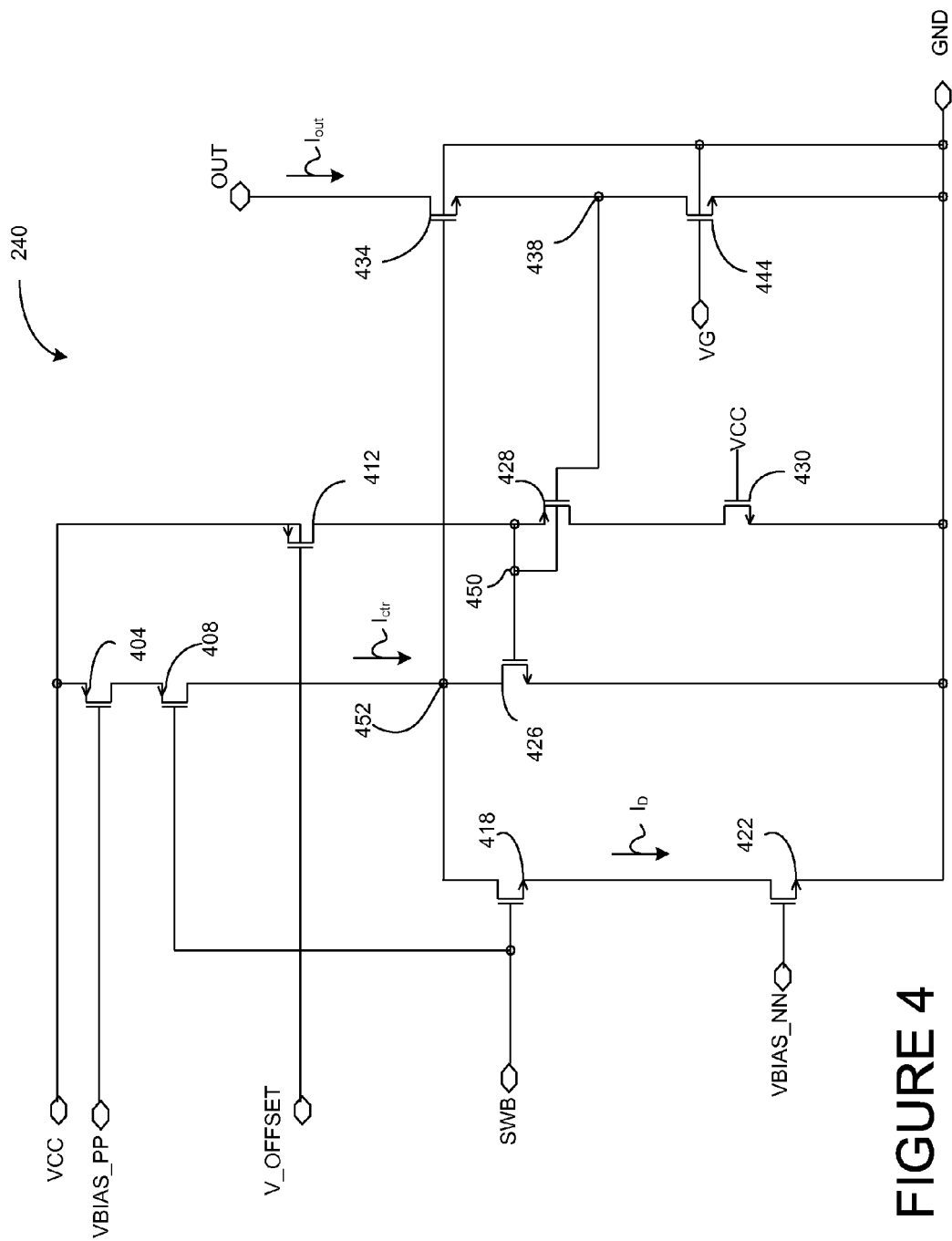
FIG. 4 is a block diagram illustrating a VI (voltage-to-current) converter, according to one embodiment.

FIG. 4 is a block diagram illustrating a VI (voltage-to-current) converter 240, according to one embodiment. In one embodiment, the VI converter 240 includes transistors 404, 408, 412, 418, 422, 426, 428, 430, 434 and 444. The transistors 408, 418 receive a signal SWB that is an inverted version of the switching signal 184. When the SWB is low (i.e., the switching signal 184 is high), the transistor 408 (a P-MOS transistor) is turned on and allows the control current Ictr to pass to a junction node 452. The control current Ictr is adjusted by the transistor 404 (a P-MOS transistor) according to the VBIAS_PP signal. The low SWB signal also turns off the N-MOS transistor 418 having its drain connected to the node 452. The switching transistor 434 is an N-MOS transistor having its drain node connected to the LED 110 via the output of the LED driver 100. When the voltage at the node 452 is pulled up, the switching transistor 434 is turned on to allow the output current Iout to flow from OUT node to the node 438 and to the ground line (GND).

Conversely, when the SWB turns high (i.e., the switching signal 184 turns low), the transistor 408 is turned off and the transistor 418 is turned on. In response, a drain current $I_D$ flows in the transistor 418 and the transistor 422 to the ground line GND. The drain current $I_D$ is controlled by the transistor 422 (an N-MOS transistor) according to VBIAS_NN signal. Therefore, the voltage level at the node 452 is dropped, turning off the switching transistor 434 and shutting off the output current Iout.

The control transistor 444 is coupled between the node 438 and the ground line (GND). The control transistor 444 is an N-MOS transistor controlled by the voltage signal VG. As described above with reference to FIG. 3, the voltage signal VG varies according to the current IEXT. Specifically, the voltage signal VG drops when the current IEXT is decreased and the voltage signal VG rises when the current IEXT is increased. The control transistor 444 is controlled by the voltage signal VG to set the output current Iout.

The voltage at node 438 is maintained at a low voltage by a feedback loop that includes the transistors 426, 428 and 434. The feedback loop functions as a voltage regulator that maintains the node 438 at a fixed voltage level. The source of the transistor 428 is connected to the body of the transistor 428, and therefore, maintains the voltage at the node 450 higher than the voltage at the 438 by a predetermined voltage. Accordingly, when the voltage at the node 438 increases, the voltage at the transistor 450 also increases. The increased voltage at the node 450 operates to increase a current between the source and the drain of the transistor 426 and lowers the voltage at the node 452. The lowered voltage at the node 452 decreases the output current Iout in the transistor 434 and lowers the voltage at the node 438. Conversely, when the voltage at the node 438 decreases, the voltage at the node 450 decreases. The decreased voltage at the node 450 in turn increases the voltage at the node 452. The increased voltage at the node 452 decreases the output current Iout in the switching transistor 434 to increase the node 438. In this way, the voltage at the node 438 is regulated to a constant voltage level.

Figure 5:
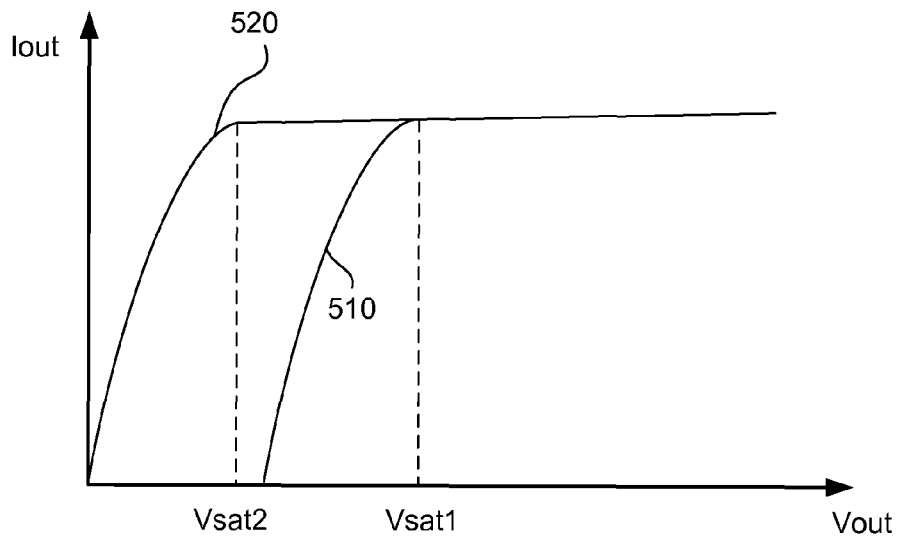
FIG. 5 is a graph illustrating lowering of the saturation voltage of a switching transistor in the LED driving circuit, according to one embodiment.

Referring to FIG. 5, a line 510 indicates an operation graph of the switching transistor 434 when the voltage level at the node 438 is not regulated by the transistor 428. Without the transistor 428, a high output voltage Vsat1 is needed to saturate the output current Iout because the voltage of at the node 438 is relatively high (i.e., the voltage across the drain and source of the transistor 434 is relatively low). By regulating the voltage at the node 438 by the transistor 428 to a lower voltage level, the voltage across the drain and source of the transistor 434 is raised by the amount of voltage decreased at the node 438. This means that the operation graph of the switching transistor 434 is shifted to a line 520 where the saturation voltage of the switching transistor 434 is reduced to Vsat2. Vsat2 is lower than Vsat1, and therefore, the output current Iout is saturated at a lower output voltage Vout when the voltage at the node 438 is decreased.

Regulating the voltage of the node 438 to a lower voltage is advantageous, among other reasons because: (i) the regulation of the output current can be improved, (ii) the switching speed of the switching transistor 434 can be increased, and (iii) a smaller transistor may be used as the control transistor 444.

Figure 6A:
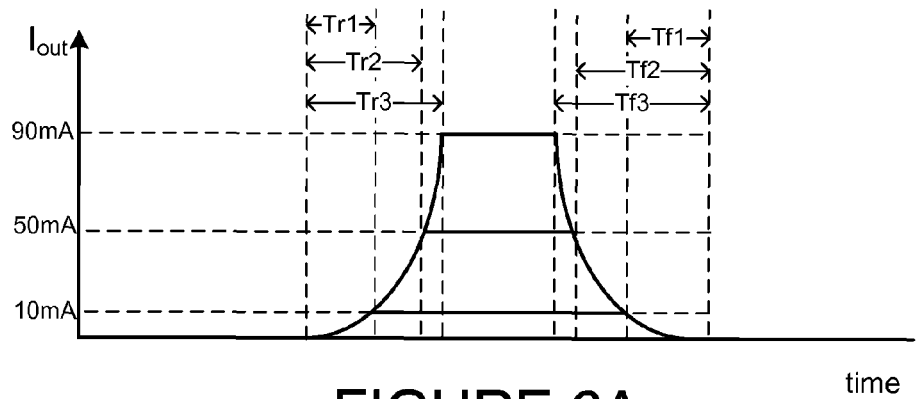
FIG. 6A is a timing diagram illustrating the switching time of the LED driver for different levels of output current without timing control, according to one embodiment.

FIG. 6A is a timing diagram illustrating the switching time of the LED driver 100 for different levels of output current Iout without a timing control, according to one embodiment. Without any rise-time control for turning on the transistor 434, the rise of the output current Iout will take progressively longer as the level of the output current Iout is increased. For example, as illustrated in FIG. 6A, the rise times of the output current of 10 mA, 50 mA and 90 mA are Tr1, Tr2 and Tr3, respectively. Similarly, without any fall-time control for turning off the transistor 434, the fall time of the output current Iout will take progressively longer as the output current Iout is increased. For example, as illustrated in FIG. 6A, the fall times of the output current of 10 mA, 50 mA and 90 mA are Tf1, Tf2 and Tf3, respectively.

Figure 6B:
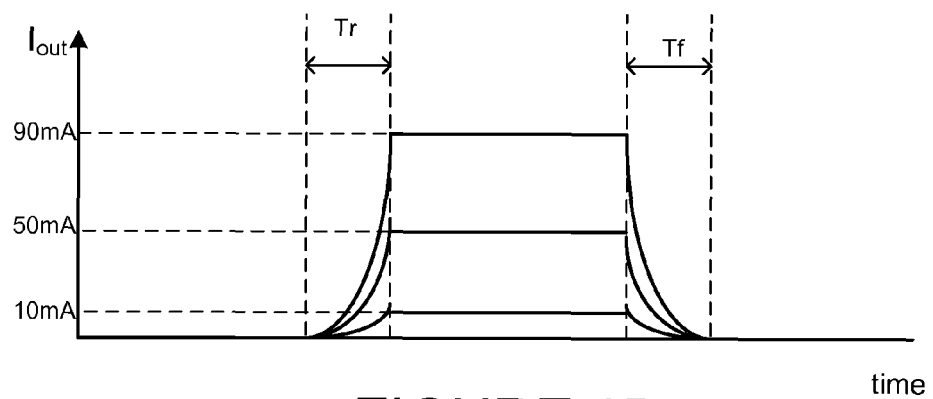
FIG. 6B is a timing diagram illustrating switching time of the LED driver for different levels of output current with timing control, according to one embodiment.

FIG. 6B is a timing diagram illustrating the switching time of the LED driver 100 for different levels of output current Iout with a timing control, according to one embodiment. In one embodiment, VBIAS_PP signal is used to adjust the rising time of the output current Iout so that the same rise time Tr is achieved across different levels of the output current Iout. Similarly, VBIAS_NN signal is also used to adjust the fall time of the output current Iout so that the same fall time Tf is achieved across different levels of the output current Iout.

To achieve the timing control, the P-MOS transistor 404 is controlled by VBIAS_PP signal to match the rising time of the switching signal of the switching transistor 434 across different levels of output current Iout. As the current IEXT is increased (translates to a higher output current Iout because of the increase in VG signal), the voltage level of VBIAS_PP signal is decreased at the bias voltage module 310. The drop in the voltage level of VBIAS_PP signal causes the control current Ictr to increase at the transistor 404. The increased control current Ictr results in steeper rise of the voltage at the node 452 and at the gate of the switching transistor 434 when the transistor 408 is turned on. Conversely, as the current IEXT is decreased (translates to a lower output current Iout because of the decrease in VG signal), the voltage level of VBIAS_PP signal is increased at the bias voltage module 310. The rise in VBIAS_PP causes the control current Ictr to decrease at the transistor 404. Therefore, the decreased control current Ictr results in slower rise of voltage at the node 452 and at the gate of the switching transistor 434 when the transistor 408 is turned on. By varying the voltage level of VBIAS_PP, the rise time Tr of the output current Iout may be made consistent across different levels of the output current Iout.

Similarly, VBIAS_NN signal is varied to match the fall time Tf of the output current Iout across different levels of the output current Iout as set by the external resistor REXT. The N-MOS transistor 422 is coupled between the transistor 418 and the ground line (GND). As the current IEXT is increased (translates to a higher output current Iout because of the increase in VG signal), the voltage level of VBIAS_NN signal is also increased. Therefore, the transistor 422 allows discharging of a large drain current $I_D$ from the node 452 to the ground line (GND) when the transistor 418 is turned on. The increased drain current $I_D$ results in steeper drop in the gate voltage at the node 452 and at the gate of the switching transistor 434. Therefore, the output current Iout is shut off at a faster speed. Conversely, as the current IEXT is decreased (translates to a higher output current Iout because of the increase in VG signal), the voltage level of VBIAS_NN signal also drops. Therefore, the drain current $I_D$ is decreased, causing the transistor 422 to reduce the voltage at the node 452 and at the gate of the switching transistor 434 at a slower rate. This leads to the output current Iout being shut off at a slower speed. By varying the voltage level of VBIAS_NN, the fall time Tf of the output current Iout may be made consistent across different levels of the output current Iout.

By adjusting the rise and fall time of the output current at different levels of output load, the switching time between the loads may be made consistent. In this way, video images rendered using the multiple LEDs operating using one or more LED drivers 100 may be operated in a synchronized manner even under different output current conditions, resulting in a higher quality video images.

Figure 7:
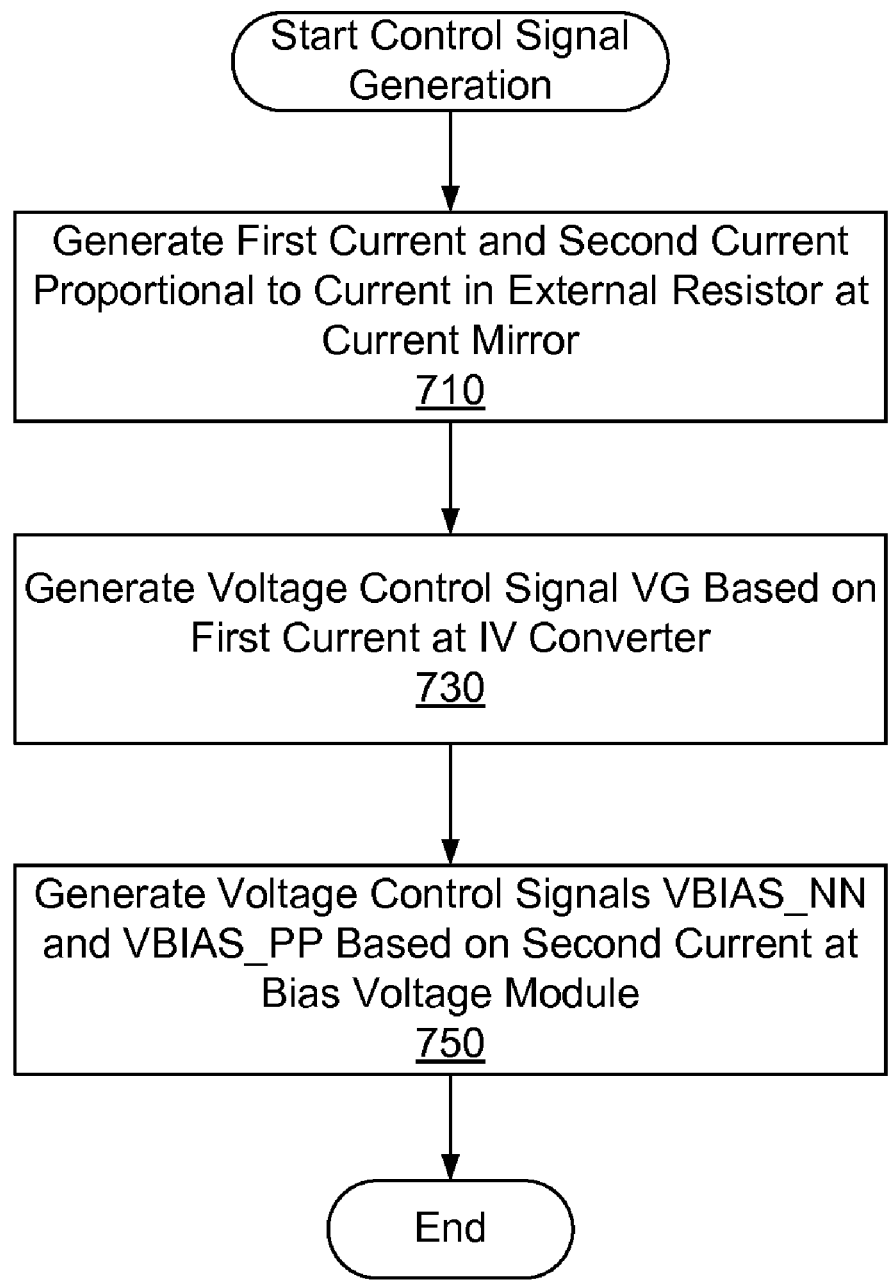
FIG. 7 is a flowchart illustrating a process of generating control signals, according to one embodiment of the present invention.

FIG. 7 is a flowchart illustrating a process of generating control signals, according to one embodiment of the present invention. The current mirror 340 generates 710 the first current 222 and the second current 398 proportional to the current IEXT in the external resistor REXT. The voltage control signal VG is generated 730 at the IV converter 250 based on the first current 222. The voltage control signals VBIAS_PP and VIAS_NN are generated 750 at the bias voltage module 310 based on the second current 398.

Figure 8:
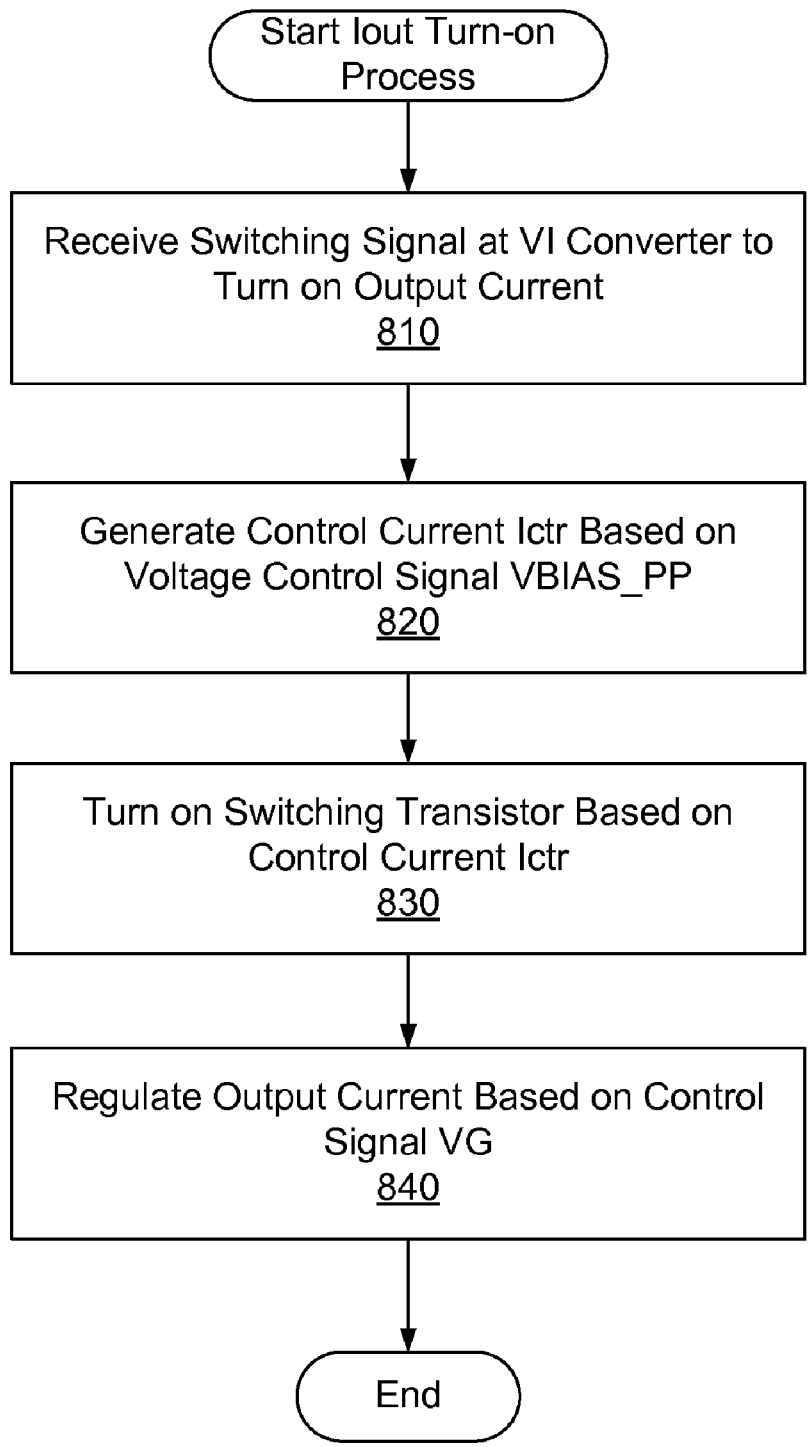
FIG. 8 is a flowchart illustrating a process of turning on an output current, according to one embodiment.

FIG. 8 is a flowchart illustrating a process of turning on the output current Iout, according to one embodiment. The switching signal 184 is received 810 (i.e., SWB turns low) to turn off the transistor 418 and turn on the transistor 408. The transistor 404 generates 820 the control current Ictr based on the received voltage control signal VBIAS_PP. The voltage of VBIAS_PP signal is relatively high for low output current Iout whereas the voltage of VBIAS_PP signal is relatively low for high output current Iout. As the voltage of VBIAS_PP signal is decreased, the control current Ictr is increased. As the voltage VBIAS_PP signal is increased, the control current Ictr is decreased. The switching transistor 434 is turned on 830 by the increase in the gate voltage of the switching transistor 434 as regulated by the control current Ictr. The turn-on speed of the switching transistor 434 is increased as the control current Ictr is increased. The turn-on speed of the switching transistor 434 is decreased as the control current Ictr is decreased. The output current Iout is regulated 840 by the control signal VG received from the bias voltage module 310. By adjusting the control current Ictr, the speed of turning on the switching transistor 434 may be made consistent across different levels of output current Iout.

Figure 9:
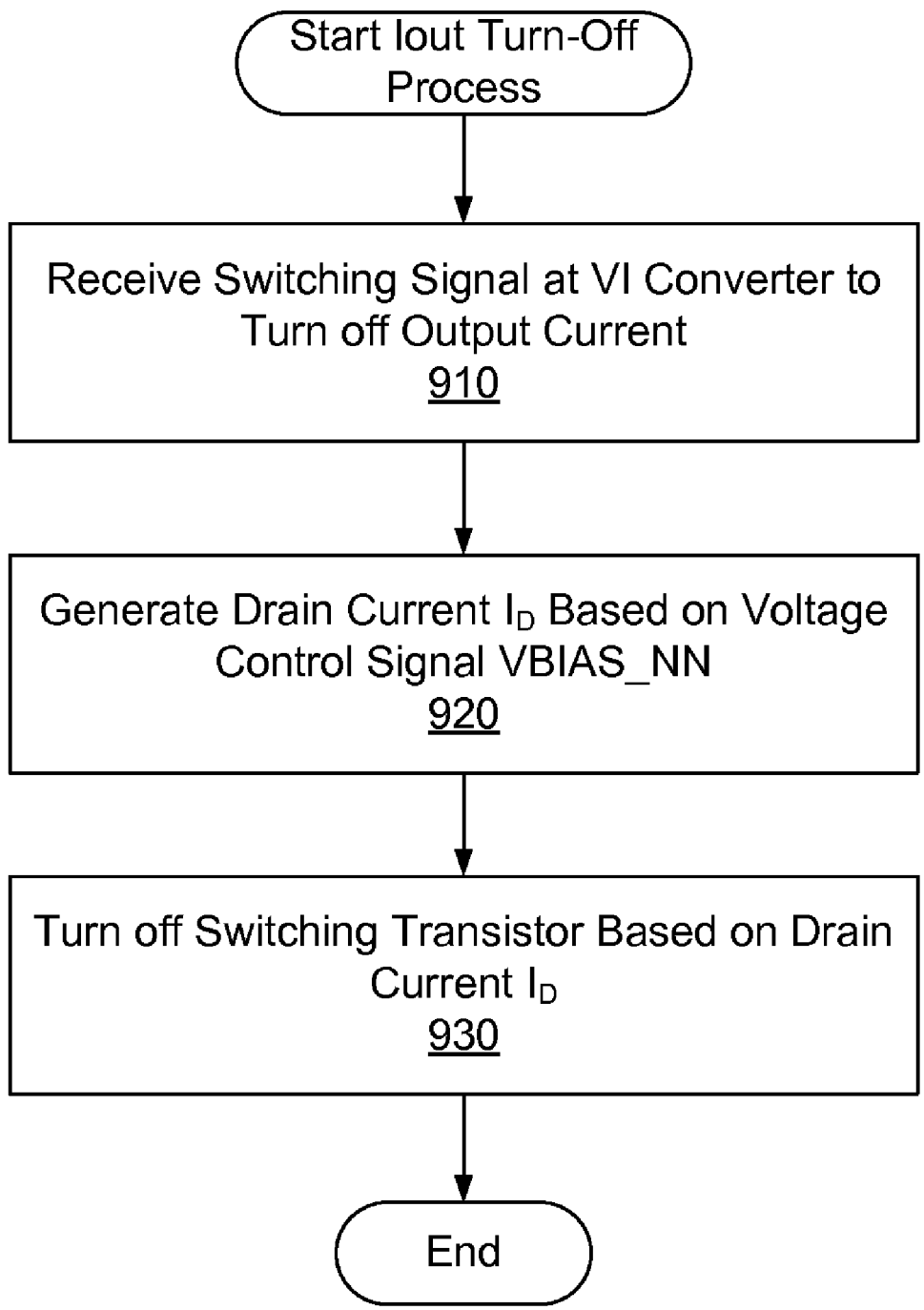
FIG. 9 is a flowchart illustrating a process of turning off the output current, according to one embodiment.

FIG. 9 is a flowchart illustrating a process of turning off the output current, according to one embodiment. The switching signal 184 is received 910 (i.e., SWB high) to turn on the transistor 418 and turn off the transistor 408. The transistor 422 generates 920 the drain current $I_D$ based on VBIAS_NN signal. As the voltage of VBIAS_NN signal is increased, the drain current $I_D$ is increased. As the voltage of VBIAS_PP signal decreases, the drain current $I_D$ is decreased. In response, the switching transistor 434 is turned off 930 by the decrease in the gate voltage of the switching transistor 434 as regulated by the drain current $I_D$. That is, the turn-off speed of the switching transistor 434 is increased as the drain current $I_D$ is increased and the turn-off speed of the switching transistor 434 is decreased as the drain current $I_D$ is decreased. By adjusting the drain current $I_D$, the speed of turning off the switching transistor 434 may be made consistent across different levels of output current Iout.

The LED driver 100 may be used to control light sources other than LEDs. For example, the LED driver 100 may control lasers.

Although the present invention has been described above with respect to several embodiments, various modifications can be made within the scope of the present invention. Accordingly, the disclosure of the present invention is intended to be illustrative, but not limiting, of the scope of the invention, which is set forth in the following claims.

What is claimed is:

1. An output stage in a driving circuit for a light source, the output stage comprising:
   a first transistor configured to turn on or off an output current in a light source based on a switching signal, the first transistor having a first node coupled to the light source, a second node connected to a first junction node and an input node for receiving the switching signal;
   a second transistor for controlling a level of the output current responsive to turning on of the first transistor based on a control signal representing a desired output current in the light source, the second transistor having a first node coupled to the first junction node and a second node coupled to a low reference voltage node; and
   a voltage regulator connected to the first junction node, the voltage regulator increasing a voltage across the first node and the second node of the first transistor by decreasing a voltage at the first junction node.

2. The output stage of claim 1, further comprising:
   a control signal generator configured to generate a first current proportional to a second current in a resistor coupled to the control signal generator; and
   a current-to-voltage converter between the control signal generator and the second transistor, the current-to-voltage converter generating the control signal responsive to receiving the first current.

3. The output stage of claim 1, further comprising a third transistor coupled between a high reference voltage node and the first transistor via a second junction node, the third transistor configured to produce a control current to the second junction node responsive to receiving a first voltage signal varying according to the desired output current to decrease time for turning on the first transistor as the desired output current is increased and increase time for turning on the first transistor as the desired output current is decreased.

4. The output stage of claim 3, further comprising a fourth transistor coupled between the low reference voltage node and the first transistor via the second junction node, the fourth transistor configured to control a drain current from the second junction node to the low reference voltage node responsive to receiving a second voltage signal varying according to the desired output current to decrease time for turning off the first transistor as the desired output current is increased and to increase time for turning off the first transistor as the desired output current is decreased.

5. The output stage of claim 1, wherein the voltage regulator comprises a feedback loop including a MOS (Metal-Oxide-Semiconductor) transistor, a body of the MOS transistor and a source of the MOS transistor coupled to a fixed voltage node, a gate of the MOS transistor coupled to the first junction node, and a drain of the MOS transistor coupled to a low reference voltage node.

6. The output stage of claim 1, wherein the first transistor, the second transistor and the voltage regulator are fabricated using a low voltage CMOS (Complementary Metal-Oxide-Semiconductor) fabrication process.

7. The output stage of claim 1, wherein the light source comprises an LED (light-emitting diode).

8. A method of controlling an output current of a light source, comprising:
   turning on or off the output current by a first transistor based on a switching signal;
   controlling a level of the output current by a second transistor between the first transistor and a low reference voltage node based on a control voltage signal representing a desired output current in the light source responsive to turning on the first transistor; and
   reducing a voltage at a junction node between the first transistor and the second transistor to increase a voltage across a source and a drain of the first transistor.

9. The method of claim 8, further comprising:
   generating a first current proportional to a second current in a resistor; and
   generating the control voltage signal based on the first current.

10. The method of claim 8, further comprising:
    receiving a second voltage signal at a third transistor coupled to a high reference voltage node, the second voltage signal varying based on the desired output current; and
    producing a control current to a second junction node between the first transistor and the third transistor by the third transistor responsive to receiving the second voltage signal, the control current increased as the desired output current is increased to decrease time for turning on the first transistor, the control current decrease as the desired output current is decreased to increase time for turning on the first transistor.

11. The method of claim 10, further comprising
    receiving a third voltage signal at a fourth transistor coupled to a low reference voltage node, the third voltage signal varying based on the desired output current; and
    controlling a drain current from the second junction node to the low reference voltage node by the fourth transistor, the drain current decreased as the desired output current is decreased to decrease time for turning off the first transistor, the drain current increased as the desired output current is increased to increase time for turning off the first transistor.

12. The method of claim 8, further comprising:
    receiving a fixed voltage signal at a MOS transistor, a body of the MOS transistor and a source of the MOS transistor coupled to receive the fixed voltage signal; and
    controlling a current from the junction node to a low reference voltage node by the MOS transistor to regulate the voltage at the junction node.

13. The method of claim 8, wherein the light source comprises an LED (light-emitting diode).

14. A driving circuit for controlling a plurality of light sources, the output stage comprising:
    a plurality of voltage-to-current converters, each of the voltage-to-current converters comprising:
       a first transistor configured to turn on or off an output current in a light source based on a switching signal, the first transistor having a first node coupled to the light source, a second node connected to a first junction node and an input node for receiving the switching signal;
       a second transistor for controlling a level of the output current responsive to turning on of the first transistor based on a control signal representing a desired output current in the light source, the second transistor having a first node coupled to the first junction node and a second node coupled to a low reference voltage node; and a voltage regulator connected to the first junction node, the voltage regulator increasing a voltage across the first node and the second node of the first transistor by decreasing a voltage at the first junction node.

15. The driving circuit claim 14, further comprising:
a control signal generator configured to generate a first current proportional to a second current in a resistor coupled to the control signal generator; and
a current-to-voltage converter between the control signal generator and the second transistor, the current-to-voltage converter generating the control signal responsive to receiving the first current.

16. The driving circuit of claim 14, wherein each of the voltage-to-current converters further comprises a third transistor coupled between a high reference voltage node and the first transistor via a second junction node, the third transistor configured to produce a control current to the second junction node responsive to receiving a first voltage signal varying according to the desired output current to decrease time for turning on the first transistor as the desired output current is increased and increase time for turning on the first transistor as the desired output current is decreased.

17. The driving circuit of claim 16, wherein each of the voltage-to-current converters further comprises a fourth transistor coupled between the low reference voltage node and the first transistor via the second junction node, the fourth transistor configured to control a drain current from the second junction node to the low reference voltage node responsive to receiving a second voltage signal varying according to the desired output current to decrease time for turning off the first transistor as the desired output current is increased and to increase time for turning off the first transistor as the desired output current is decreased.

18. The driving circuit of claim 14, wherein each of the voltage-to-current converter comprises a MOS transistor, a body of the MOS transistor and a source of the MOS transistor coupled to a fixed voltage node, a gate of the MOS transistor coupled to the first junction node, and a drain of the MOS transistor coupled to a low reference voltage node.

19. The driving circuit of claim 14, wherein the first transistor, the second transistor and the voltage regulator are fabricated using low voltage CMOS (Complementary Metal-Oxide-Semiconductor) fabrication process.

20. The driving circuit of claim 14, wherein the voltage regulator comprises a feedback loop including a MOS (Metal-Oxide-Semiconductor) transistor, a body of the MOS transistor and a source of the MOS transistor coupled to a fixed voltage node, a gate of the MOS transistor coupled to the first junction node, and a drain of the MOS transistor coupled to a low reference voltage node.

* * * * *